United States Patent [19]
Romans

[11] 3,860,912
[45] Jan. 14, 1975

[54] POWER SUPPLY MONITORING DEVICE

[75] Inventor: Gleason Romans, Tulsa, Okla.

[73] Assignee: Aviation, Inc., Tulsa, Okla.

[22] Filed: Aug. 8, 1973

[21] Appl. No.: 386,850

[52] U.S. Cl. .......... 340/152 T, 343/225, 340/248 C
[51] Int. Cl. ............................................. G08b 21/00
[58] Field of Search ........ 340/248 C, 253 C, 152 T;
325/31; 324/71; 343/225

[56] References Cited
UNITED STATES PATENTS
3,588,860   6/1971   Hayward, Jr. .................... 340/248 C
3,696,365   10/1972  Ward ............................... 340/253 C Primary Examiner—Donald J. Yusko
Attorney, Agent, or Firm—Head & Johnson

[57] ABSTRACT

A power supply monitoring device for monitoring remote power line connected cathodic protection rectifier operation along a pipeline from pipeline patrol vehicles and comprising transmitter means disposed adjacent to each power supply rectifier and operably connected to the power line for transmitting a signal, monitoring means operably connected to the output of the cathodic protection rectifier for sensing the output current thereof, signal modulating means operably connected between the monitor means and the transmitter means for modulating the transmitter signal in accordance with the rectifier current level; receiver means disposed within the patrol vehicle for receiving the output of the transmitter means when the said patrol vehicle is in the near proximity of the rectifier and audio output means operably connected to the receiver means for indicating the cathodic protection rectifier current level.

9 Claims, 5 Drawing Figures

POWER SUPPLY MONITORING DEVICE

BACKGROUND OF THE INVENTION

1. Field of the Invention

This invention relates to power supply monitoring devices and more particularly, but not by way of limitation, to a device for monitoring remote cathodic protection rectifiers along a pipeline.

2. Description of the Prior Art

Underground steel cross-country pipelines tend to build up electrical charges caused by the earth's magnetic field. Pipe also serves as a conductor between soils of differing chemical composition, conductivity, etc., in effect forming a battery and setting up circulating currents in the pipe-soil system. After building a charge to a certain value and depending on soil conductivity and conditions, an electrical discharge will occur from the steel pipe to the ground that will cause corrosion or more particularly will cause steel particles to be carried away from the pipe, thereby pitting the said pipe which in turn can cause a hole to develop at this point of discharge through deplating action. Various devices have been used to counteract this electrolytic process, the most common device being an electrical power supply or more commonly called a cathodic protection rectifier to produce a rectified low voltage DC current. The DC current output of the said rectifier is then connected to the pipe to effectively counteract or negate the electrical charge build-up in a manner to prevent damage to the pipe wall material. Pipe is made cathodic so plating action occurs at pipe and deplating occurs in buried anodic beds (ground bed).

These cathodic protection rectifiers are located along the pipelines, generally in remote areas not readily accessible for inspection by company personnel. Consequently, various devices have been used for visual observation from airplanes that routinely patrol the pipeline right-of-way for this and other purposes to make a determination as to whether or not the said power supply is operating properly. The most common device utilized is simply a red light on top of a pole that burns if the power supply is functioning properly and goes out if the power supply fails. This device has several disadvantages in that the basic concept of having the monitoring light go out when there is a failure is backwards to a reliable monitoring method. Also, if the monitoring personnel in the airplane does not know exactly where to look for the light he may fail to notice that there is no light burning. It has also been found that the red lens of such a light tends to glow in the bright sunlight to a degree that it is difficult to determine whether or not it is in fact burning or simply reflecting available sunlight. It has also been noted in the past that hunters hunting in these remote areas tend to make target practice of these lights.

Another attempted solution to this problem of monitoring power supplies is by simply replacing the red light indication discussed above with a spinning pinwheel or the like which is motor driven from the output of the power supply to be monitored so that when the said power supply fails the pinwheel will no longer spin. Again, there is a problem if the pilot does not know exactly where to look for the spinning pinwheel he may fail to determine whether or not the power supply is operating properly.

SUMMARY OF THE INVENTION

The present invention contemplates a novel power supply monitoring device for monitoring these remote cathodic protection rectifiers along a pipeline. The present invention utilizes a transmitter which is disposed adjacent to the cathodic protection rectifier and is provided with a power supply which is connected directly to an ordinary AC power line. A current monitoring means is operably connected to the output of the cathodic protection rectifier for sensing the output current thereof and a signal modulator means is operably connected between the monitor means and the transmitter means for modulating the transmitter signal in accordance with the rectifier current level. This monitor means is provided with an adjustable trip point or threshold setting and is constructed so that when the cathodic protection rectifier current is at an acceptable level the modulator means will cause the transmitter to send a tone signal and when the cathodic protection rectifier current is below an acceptable level the transmitter will send a monotone signal. When the cathodic protection rectifier current is at or within its specified threshold band, ripple voltage from the transmitter power supply is utilized to send a 120 cycle chopped or garbled signal which will indicate to the receiver thereof that the current output level from the cathodic protection rectifier is of questionable status.

The use of the present invention does not require that the personnel in the patrol aircraft know the exact location of the monitoring device but they need only to know the approximate location since the signal will be received by the aircraft when the said aircraft is in the near proximity of the monitoring device. It is also obvious that if no signal is received at or near the location of one of the rectifiers then either the monitoring device has malfunctioned or the line power is off which in either case would require ground attention by maintenance crew.

The present invention provides a simple and efficient means for remotely monitoring the operational condition of the cathodic protection rectifiers along a pipeline.

DESCRIPTION OF THE DRAWINGS

Other and further advantageous features of the present invention will hereinafter more fully appear in connection with a detailed description of the drawings in which.

DESCRIPTION OF THE PREFERRED EMBODIMENT

Figure 1:
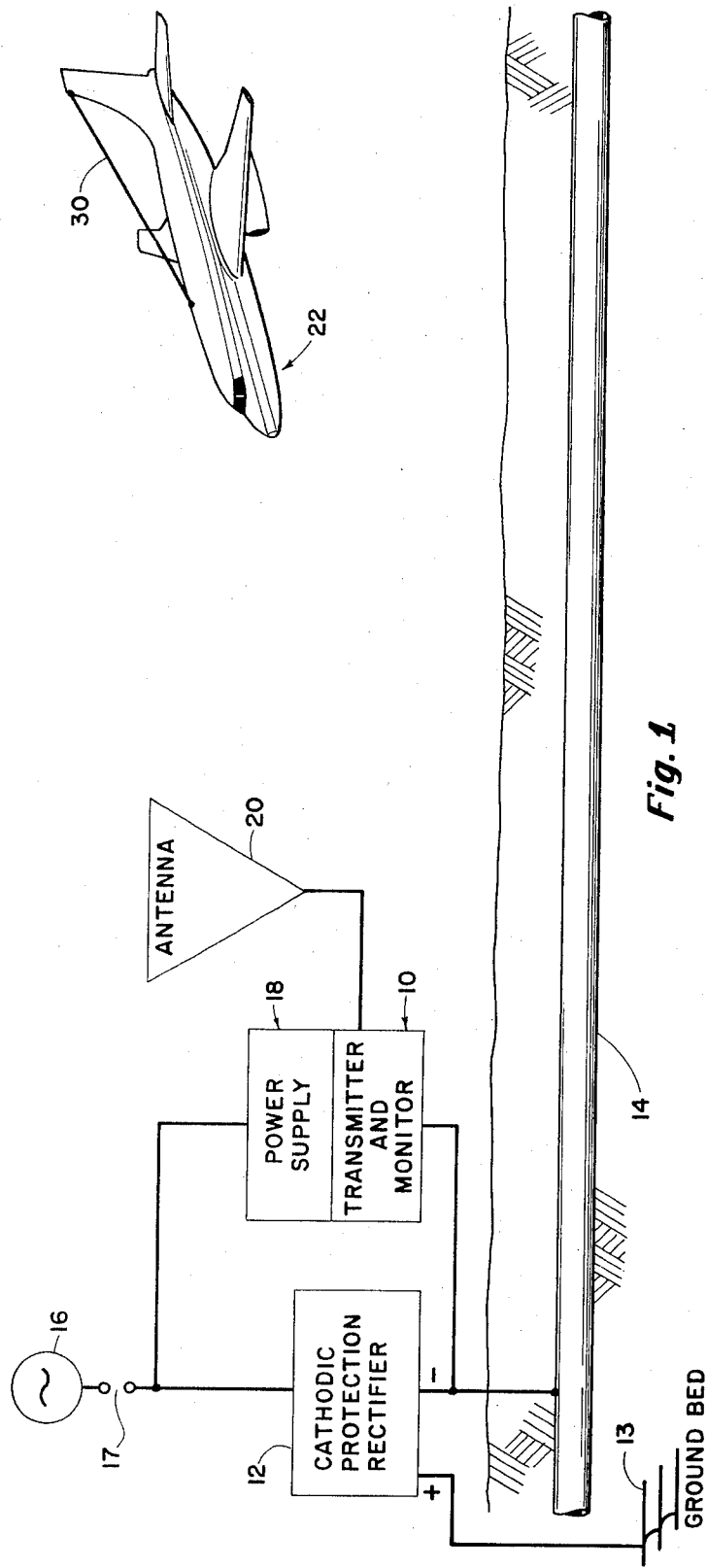
FIG. 1 is a functional block diagram depicting a pipeline equipped with a cathodic protection rectifier and a monitoring device and a patrol aircraft embodying the present invention.

Referring to the drawings in detail, reference character 10 generally indicates a transmitter and monitor means which is operably connected to the output of a cathodic protection rectifier 12, the output of the said cathodic protection rectifier 12 being connected directly to an underground pipeline 14 for combatting electrolytic discharge naturally occuring in such pipelines. The rectifier 12 is also connected to buried anodic ground beds 13. The cathodic protection rectifier 12 derives its power from an ordinary AC power line 16 and is tied in below fuses or breakers 17 so that power off results in power off or fail condition rather than low current signal condition which would imply rectifier was working but delivering current less than threshold setting. The power supply 18 for the transmitter and monitor means 10 is also directly coupled to this AC power source 16 and may be connected above the breakers for also monitoring the power line or may be connected below the breaker as shown. The transmitter and monitor means 10 is provided with an antenna 20 for transmitting the signal produced thereby.

Figure 5:
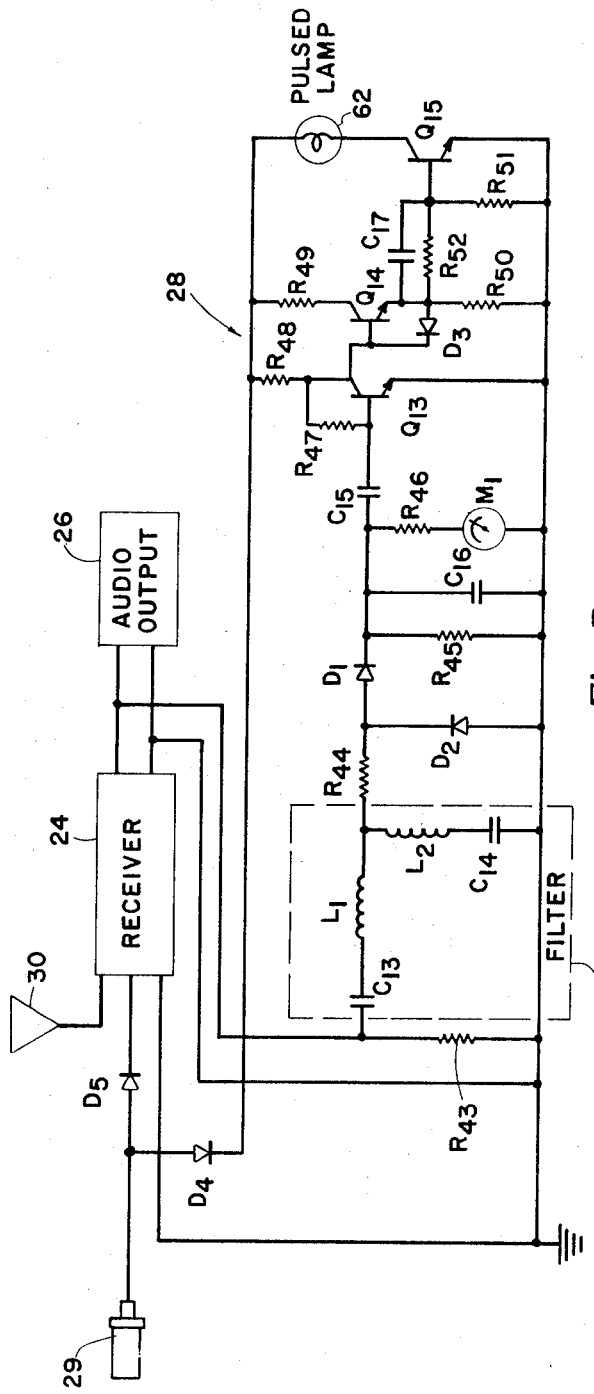
FIG. 5 is a schematic diagram of the receiver means carried by the patrol aircraft.

Referring now to FIGS. 1 and 5, reference character 22 generally indicates a pipeline patrol vehicle which in this case is an aircraft which may be flown along the pipeline for monitoring the transmitter output and for other observation purposes. The aircraft is equipped with a receiver 24 which is tunable to the transmitter output from the transmitter and monitor means 10. The receiver is provided with an audio output means 26 operably connected thereto and a visual output means 28 which is coupled to the output of the receiver 24. The receiver 24 is connected directly to the aircraft power system 29 and is provided with an antenna 30 for picking up the signal from the transmitter and monitor means 10. The antenna 30 may take the form of a straight wire antenna located in any suitable place on the aircraft 22.

Figure 2:
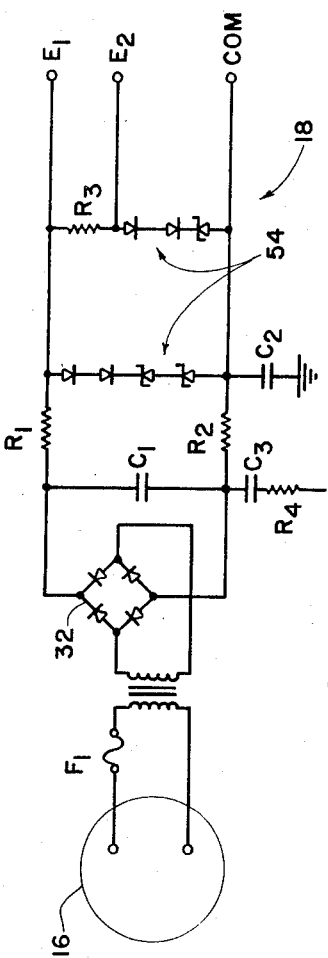
FIG. 2 is a schematic diagram of the power supply for operating the ground transmitter of the present invention.

Referring now to FIG. 2, the transmitter power supply 18 generally comprises a transformer $T_1$ having the primary side thereof connected to the ordinary AC power source 16 through fuse $F_1$. The secondary side of the transformer $T_1$ is operably connected to a full wave bridge rectifier 32 and is provided with a capacitor filter, a plurality of voltage control semiconductors generally indicated by reference character 34, current limiting resistors $R_1$, $R_2$ and $R_3$ whereby the outputs of the power supply 18 are represented by one voltage level being $E_1$, the second voltage level being $E_2$ and a common designated by COM. The common is connected to ground through a capacitor $C_2$ and a terminal point A is connected to one side of the full wave rectifier 32 through a resistor $R_4$ and the capacitor $C_3$ for a purpose that will be hereinafter set forth.

Figure 3:
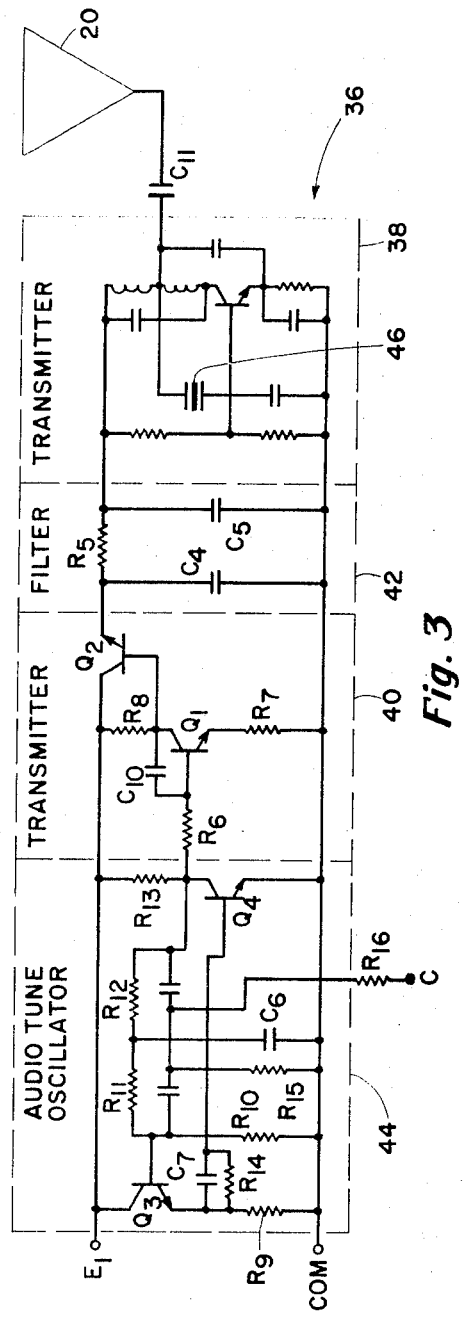
FIG. 3 is a schematic diagram of the transmitter means of the present invention.

The transmitter and monitor means 10 comprises a transmitter means generally indicated by reference character 36 and depicted in FIG. 3. The transmitter means 36 comprises a crystal controlled transmitter 38, a transmitter modulator 40, a filter 42 operably connected between the transmitter modulator and the transmitter and an audio tone oscillator 44 which is operably connected to the transmitter modulator 40. The frequency of the transmitter 38 is controlled by tuned crystal 46. The input of the transmitter 38 is operably connected to one side of the RC filter 42 which consists of a resistor $R_5$ and a pair of oppositely disposed filtering capacitors $C_4$ and $C_5$ connecting either side of the resistor $R_5$ to the common. The output of the transmitter 38 is coupled to the antenna 20 through D.C. isolation capacitor $C_{11}$. The opposite side of the filter is connected to the output of the transmitter modulator 40 which comprises a transistor $Q_1$ having the base thereof connected to the output of the audio tone oscillator 44 through a load resistor $R_6$. The emitter of the transistor $Q_1$ is connected to common through a resistor $R_7$ and the collector of the said transistor $Q_1$ is connected to the power source $E_1$ through a resistor $R_8$. The collector of the transistor $Q_1$ is also connected directly to the base of a second transistor $Q_2$ which has its collector and emitter connected in series with the power source $E_1$ and the resistor $R_5$ of the filter 42. The base of transistor $Q_1$ is connected to the collector of the transistor $Q_1$ through a capacitor $C_{10}$ to provide gain roll-off and prevent R. F. amplification by transistor $Q_1$.

Therefore, when the audio tone oscillator output is provided at the base of the transistor $Q_1$, the transistor $Q_1$ will then modulate the transistor $Q_2$ which in turn modulates the voltage and current from power source $E_1$ to the transmitter 38.

The audio tone oscillator 44 comprises a transistor $Q_3$ having the collector thereof connected to the power source $E_1$ and the emitter thereof connected to common through the resistor $R_9$. The base of the transistor $Q_3$ is connected to common through a resistor $R_{10}$ and is connected to the input resistor $R_6$ of the transmitter modulator 40 through resistors $R_{11}$ and $R_{12}$ connected in series therewith. The junction between the resistors $R_{12}$ and $R_6$ is connected to the power source $E_1$ through resistor $R_{13}$. The junction between the resistor at $R_{11}$ and $R_{12}$ is connected to common through a capacitor $C_6$.

A second transistor $Q_4$ having the emitter thereof connected to common and the collector thereof connected to the power source $E_1$ through the resistor $R_{13}$ has the base thereof connected to the emitter of the transistor $Q_3$ through a resistor $R_{14}$ and capacitor $C_7$ connected in parallel therewith. The base of the transistor $Q_3$ is also connected to common through a capacitor $C_8$ and a resistor $R_{15}$ connected in series therewith. The junction between the capacitor $C_8$ and the resistor $R_{15}$ is connected to the collector of the transistor $Q_4$ through a capacitor $C_9$. The junction between the capacitor $C_8$ and $C_9$ is connected to a terminal point C through a resistor $R_{16}$ for a purpose that will be hereinafter set forth.

When the terminal C of the audio tone oscillator circuit 44 is connected to common in a manner that will be hereinafter set forth, the resistor $R_{16}$ is in effect placed in parallel with the resistor $R_{10}$ and the circuit hereinbefore described sets up a high frequency oscillatory output which is used to drive the transmitter modulator 40. When the resistor $R_{16}$ is not connected to common, a lower frequency output drives the transmitter modulator circuit 40.

Resistors $R_{11}$, $R_{12}$, $R_{15}$ and $R_{16}$ and capacitors $C_6$, $C_8$ and $C_9$ form a parallel bridged "T" or notch filter feedback from $Q_4$ to $Q_3$. The filter provides a high impedence at the notch frequency and comparatively low impedence for all other frequencies. Feedback around the loop is negative for frequencies other than the notch frequency so that oscillation can only occur at or near the notch frequency. The shunting of resistors $R_{15}$ with $R_{16}$ as will be hereinafter set forth alters the filter characteristic and results in the higher frequency of oscillation.

Figure 4:
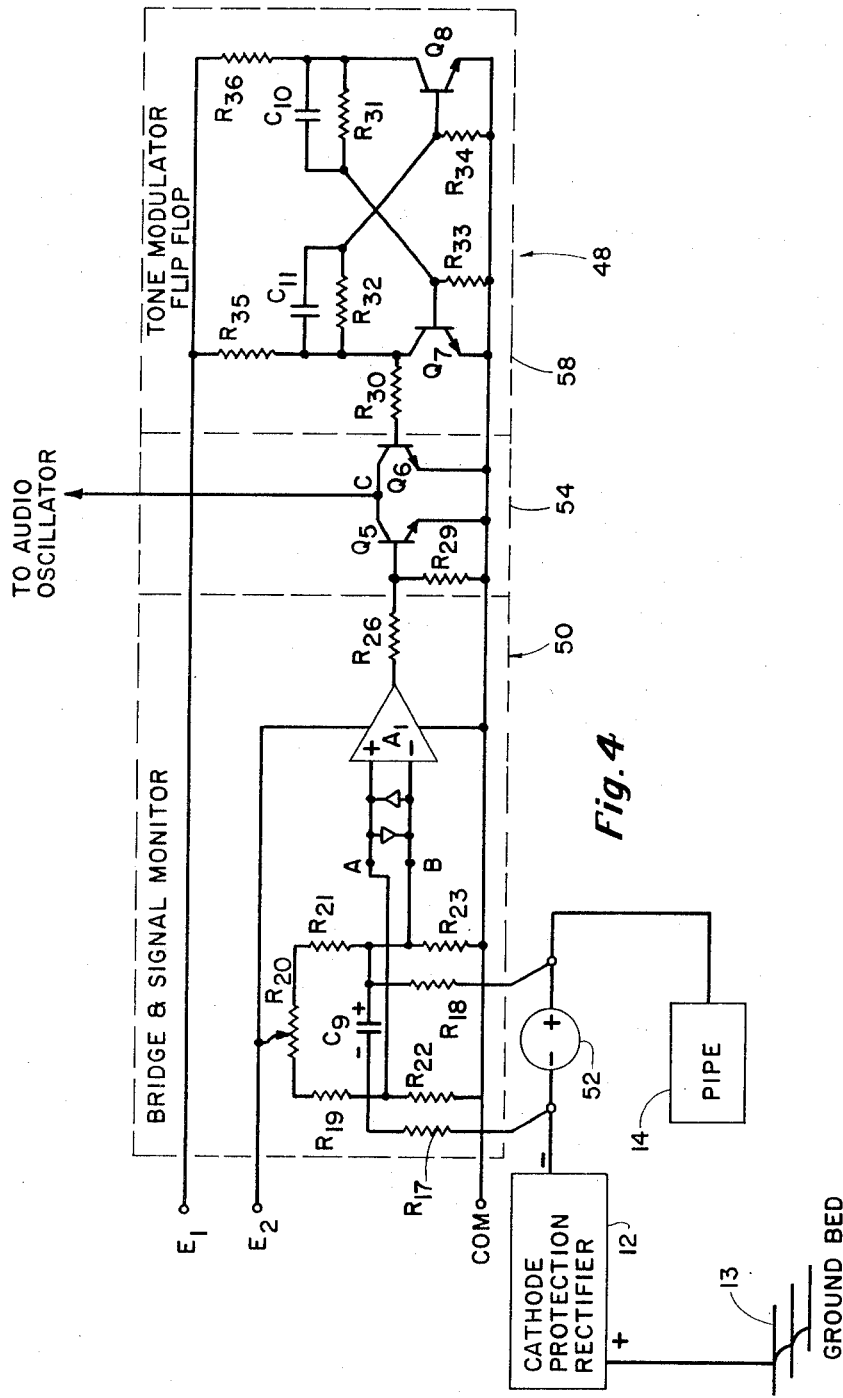
FIG. 4 is a schematic diagram of the monitor means and modulator means of the present invention.

Referring now to FIG. 4, reference character 48 generally indicates a current monitoring means for monitoring the output current from the cathodic protection rectifier 12. The monitoring means 48 comprises a bridge and signal monitor 50 which is operably connected to the output of the cathodic protection rectifier 12 and normally connected on either side of an existing current meter 52 which is normally connected between the cathodic protection rectifier 12 and the pipeline 14. The output of the bridge and signal monitor 50 is operably connected to a signal monitor switch 54. A tone modulator flip-flop 58 is also operably connected to the signal monitor switch 54.

The bridge and signal monitor utilizes a resistance bridge network for sensing the current output of the cathodic protection rectifier 12 and comprises a load resistor $R_{17}$ connected between the negative side of the meter 52 and a terminal point A of the bridge and signal monitor 50. The positive side of the meter 52 is connected to a terminal point B of the bridge and signal monitor 50 through a substantially identical load resistor $R_{18}$. If reverse indication is desired, i.e., constant tone for acceptable current level from the rectifier 12 dual tone for unacceptable condition, connect $R_{17}$ to positive side of meter 52 and $R_{18}$ to negative side of meter 52. The terminal point A is connected to the terminal point B through two arms of the bridge by way of a resistor $R_{19}$, the resistive element of a potentiometer $R_{20}$ and a third resistor $R_{21}$ connected in series therewith, the resistor $R_{21}$ being of equal value to that of the resistor $R_{19}$. The terminal point A is also connected to terminal B through $R_{22}$ to common, common to $R_{23}$, $R_{23}$ to terminal B and additionally through $R_{17}$, meter 52 and $R_{18}$. The resistors $R_{19}$, $R_{21}$, $R_{22}$ and $R_{23}$ are essentially of equal value. The capacitor $C_9$ is also connected between the terminal points A and B. The contactor arm of the potentiometer $R_{20}$ is connected to the power source $E_2$ hereinbefore described.

The bridge and signal monitor 50 includes an operational amplifier $A_1$ having the input terminals thereof operably connected to the terminal points A and B. The operational amplifier $A_1$ is connected to the power source $E_2$ and to common. The output of the operational amplifier $A_1$ is connected to the input of the signal monitor switch 54. When the potential at terminal B is higher than that at terminal A, the output of the operational amplifier $A_1$ will drive negative toward zero. When the electrical potential is higher at A than at B the operational amplifier $A_1$ will drive positive toward $E_2$ and when the potential at A and B is equal there will be approximately ½ $E_2$ output from the operational amplifier $A_1$. When B is slightly greater than A, the output drives toward zero but is repeatedly turned back on by the ripple 120 cycle voltage provided at terminal A by its connection with the terminal A of the power source 18 of FIG. 2. As B becomes greater than A, the ripple is overridden and the output is driven to zero holding $Q_5$ off. During the few millivolts change (or interval) required to cause the amplifier to switch from one extreme to the other, i.e., within the active region, the output is the amplifier 120 cycle ripple input.

The signal monitor switch 54 comprises a pair of NPN transistors $Q_5$ and $Q_6$ having the collectors thereof connected to a common terminal C and the emitters thereof connected directly to common. The base of the transistor $Q_5$ is connected to the output of operational amplifier $A_1$ through the resistor $R_{26}$ and is connected to common through a resistor $R_{29}$. The base of the transistor $Q_6$ is connected directly to the tone modulator flip-flop 58 through a load resistor $R_{30}$.

The tone modulator flip-flop 58 is a typical free running flip-flop circuit comprising a pair of cross coupled transistors $Q_7$ and $Q_8$, the base of $Q_7$ being connected to the collector of $Q_8$ through a resistor $R_{31}$ and the base of the transistor $Q_8$ being connected to the collector of the transistor $Q_7$ through a resistor $R_{32}$. The emitters of the transistors $Q_7$ and $Q_8$ are connected directly to common and the bases thereof are connected to common through the load resistors $R_{33}$ and $R_{34}$, respectively. The collectors of the transistors $Q_7$ and $Q_8$ are connected to the power source $E_1$ through resistors $R_{35}$ and $R_{36}$, respectively. The base of the transistor $Q_7$ is likewise connected to the power source $E_1$ through a capacitor $C_{10}$ and the resistor $R_{36}$ and the base of the transistor $Q_8$ is connected to the power source $E_1$ through a capacitor $C_{11}$ and the resistor $R_{35}$ connected in series therewith. Therefore, the output of the tone modulator flip-flop 58 through the load resistor $R_{30}$ to the base of the transistor $Q_6$ of the signal monitor switch 54 alternately goes from positive to common alternately switching the transistor $Q_6$ on and off thereby alternately connecting and disconnecting the terminal point C to common.

It is also pointed out that the terminal point A at the input of the operational amplifier $A_1$ is connected to the terminal point A of the power supply of FIG. 2 for applying the 120 cycle ripple voltage to the input of the operational amplifier $A_1$ for a purpose that will hereinafter be set forth.

Referring now to FIG. 5, the visual output circuit 28 of the receiver 24 comprises an input filter circuit 60 which is connected to the audio output of the receiver 24, one terminal thereof being loaded by the resistor $R_{43}$. The filter comprises a pair of inductors $L_1$ and $L_2$ and a pair of corresponding capacitors $C_{13}$ and $C_{14}$, one side of the capacitor $C_{13}$ being connected directly to the audio output of the receiver and in series with the inductor $L_1$ whereas the inductor $L_2$ is connected in series with the capacitor $C_{14}$ to aircraft ground. The output of the filter 60 is connected to a demodulator and1 meter circuit (to convert the dual tone to a single signal at the flip-flop modulating frequency and to provide a meter reading indicative of signal strength) comprised of $R_{44}$, $D_1$, $D_2$, $R_{45}$, $C_{16}$, $R_{46}$ and $M_1$ which is coupled to the base of $Q_{13}$ through $C_{15}$. $Q_{13}$, $Q_{14}$, $Q_{15}$ and associated resistors, capacitors and diode are switched by the demodulated input to $Q_{13}$ resulting in lamp 62 being turned on and off at the modulating flip-flop frequency as $Q_{15}$ turns on and off in response to the signal input to $Q_{13}$. If the input signal is monotone, the lamp will remain off except for random noise or on depending upon the biasing applied to $Q_{13}$ and filtering in demodulator. Diodes $D_4$ and $D_5$ protect against reverse battery polarity in the event battery connections are reversed.

In operation, at the time of installation of the power supply monitoring device at a cathodic protection rectifier site, the terminals of the bridge and signal monitor 50 are connected to appropriate sides of the cathodic protection rectifier current meter 52 and the adjustable potentiometer $R_{20}$ is adjusted to set a threshold level below which the current passing from the cathode protection rectifier 12 to the pipeline 14 is insufficient for proper cathodic protection for the pipeline. This setting may be made in the shop prior to installation at the site but in effect amounts to the balancing of the bridge circuit hereinbefore described at a particular desired threshold current level from the cathodic protection rectifier to the pipeline. Therefore, if the current level from the cathodic protection rectifier is sufficiently high to be above the threshold point, the terminal point B will be positive with respect to the terminal point A in the bridge and signal monitor circuit 50. However, if the current from the cathodic protection rectifier 12 is below the threshold level set, the voltage at terminal A will be positive with respect to the voltage at terminal B and in the third instance when the cathodic protection rectifier current is at or about the threshold level the bridge will be essentially balanced and the voltage at A will be substantially equal to the voltage at B except for the ripple voltage that is applied to the terminal A from the power supply circuit 18 as shown in FIG. 2.

In the case where the current level from the cathodic protection rectifier is sufficiently high, terminal point B will be positive with respect to terminal point A and since the operational amplifier $A_1$ has an inverted output, the output therefrom will be low which will turn off the transistor $Q_5$ and the transistor $Q_6$ will be alternately turned on and off by the tone modulator flip-flop 58. This on and off pulsing of the transistor $Q_6$ in the signal monitor switch 54 will in effect alternately connect and disconnect the resistor $R_{16}$ of the audio tone oscillator 44 to common as hereinbefore set forth. This action of the transistor $Q_6$ of the audio oscillator causes the audio tone oscillator 44 to alternate between the high and the low frequency which in turn modulates the transmitter through the transmitter modulator 40 and causes the transmitter to put out a dual tone high and low frequency alternating signal which is received by the aircraft receiver 24 through its antenna 30. This signal is transmitted into the audio output 26 which may be pilot headphones or a speaker box located in the aircraft cockpit. The output of this dual tone is also fed into the visual output circuit 28 through the filter 60 and is smoothed into a sine wave type curve which is passed through the amplifier transistors $Q_{13}$ and $Q_{14}$ to operate the switching transistor $Q_{15}$ on and off at a beat corresponding with dual tone which in effect provides a pulsed lamp visual output from the lamp 62.

When the current from the cathodic protection rectifier 12 to the pipeline 14 falls below the threshold set by the potentiometer $R_{20}$ terminal point A of the bridge and signal monitor 50 will be at a positive voltage with respect to B and the inverted output from the operational amplifier $A_1$ will go positive and thereby turn on the transistor $Q_5$ of the signal monitor switch 54. By turning on the transistor $Q_5$ the terminal point C is grounded to common which in effect grounds the resistor $R_{16}$ of the audio tone oscillator 44 thereby locking the audio tone oscillator into a fixed high frequency signal which in turn modulates the transmitter at a fixed high frequency through the transmitter modulator 40.

The single monotone high frequency is transmitted to the aircraft where it is received by the receiver 24. The audio output from the receiver 24 is a single high frequency monotone thereby indicating to the observer in the aircraft that the cathodic protection rectifier current has fallen below an acceptable level. This same signal is fed into the visual output circuit 28 from the audio output of the receiver 24 and being of a high constant frequency, any switching that occurs in the transistor $Q_{15}$ of the output circuit 28 is so rapid that the lamp 62 thereof will appear to be simply in an 'on' condition without any pulsing apparent to the observer thereof. It is noted the lamp 62 might be on or off depending upon filter characteristics of the demodulator and biasing established for $Q_{13}$ but any switching on and off would be random.

In the case where the cathodic protection rectifier current to the pipeline 14 is at or near the predetermined threshold level set by the potentiometer $R_{20}$ of the bridge circuit, the voltage levels at terminals A and B will be substantially equal as far as the bridge output is concerned, but the ripple voltage from the power supply 18 being applied at terminal A of the bridge and signal monitor 54 will cause the operational amplifier $A_1$ to rapidly go high and low thereby rapidly switching the transistor $Q_5$ on and off at a much higher rate than the switching of the transistor $Q_6$ due to the tone modulator flip-flop output which causes the terminal point C of the audio tone oscillator 44 to be intermittently connected to common which gives rise to a very erratic dual tone signal from the oscillator which has an effective sound of being a garbled transmission.

This transmission modulates the transmitter through the transmitter modulator 40. The tone received at the receiver audio output 26 of the aircraft is a garbled sound indicating to the observer in the aircraft that the current from the cathodic protection rectifier is of a questionable level and might require closer observation in the future to insure that it does not go below the acceptable output level. The output from the receiver 24 is also fed into the visual output circuit 28 and the intermittent dual tone will be transmitted through the filter 60 and the amplifier transistors $Q_{13}$ and $Q_{14}$ which will in turn cause the switching transistor $Q_{15}$ to intermittently turn on and off in an erratic manner thereby causing an erratic pulsed lamp visual output from the lamp 62.

In cases where cathodic protection rectifiers may be located at relatively short distances apart so that the transmission of adjacent power supply monitoring devices could overlap, it may be necessary to switch the operational sequence of the monitoring device so that when the current level from the cathodic protection rectifier is in an acceptable level, the single high frequency monotone is received at the aircraft receiver 24 and when the current from the cathodic protection rectifier 12 is below the acceptable level a dual tone signal is received. This reverse sequence may be easily accomplished by simply crossing the lead from the bridge circuit at terminal A with that of terminal B thereby providing the desired output signal indicating the status of the cathodic protection rectifier 12. Stated another way, in referring to the bridge and signal monitor circuit 50 of FIG. 4 the junction point between the resistors $R_{21}$ and $R_{23}$ would be connected to the A terminal input of the operational amplifier $A_1$ and the junction between the resistors $R_{19}$ and $R_{22}$ would be connected to the A terminal input of the operational amplifier $A_1$ and the junction between the resistors $R_{19}$ and $R_{22}$ would be connected to the B terminal input of the operational amplifier $A_1$. In either case the output of the transmitter 58 would be the same when the cathodic protection rectifier current is in a threshold area condition or within the threshold band which is set by the potentiometer $R_{20}$ of the bridge and signal monitor circuit 50.

From the foregoing it is apparent that the present invention provides a novel power supply monitoring device for monitoring remote power line connected cathodic protection rectifier operations along a pipeline from a pipeline patrol vehicle which may consist of an aircraft as hereinbefore described or a road type motor vehicle equipped with the receiver equipment 24 as hereinbefore described.

Whereas, the present invention has been described in particular relation to drawings attached hereto, it is understood that other and further modifications apart from those shown or suggested herein may be made within the spirit and scope of this invention.

What is claimed is:

1. A power supply monitoring device for monitoring the output of remote power line connected cathodic protection rectifiers along a pipeline from a pipeline patrol vehicle and comprising transmitter means disposed adjacent to each power supply rectifier for transmitting a signal, monitoring means operably connected to the output of the cathodic protection rectifier for sensing the output current level thereof, signal modulating means operably connected to the transmitter means for modulating the transmitter signal, monitor switching means operably connected between the monitor means and the signal modulating means for keying the modulating means in accordance with the rectifier current level; a monitoring device D.C. power supply having an input terminal and output terminal, its input terminal operably connected to the power line and its output terminal connected to the transmitter means, the monitoring means and the signal modulating means; receiver means disposed within the patrol vehicle for receiving the output of the transmitter means when the said patrol vehicle is in the near proximity of the rectifier, and audio output means operably connected to the receiver means for audibly indicating the cathodic protection rectifier status.

2. A power supply monitoring device as set forth in claim 1 wherein the audio output means is a speaker box disposed within the patrol vehicle.

3. A power supply monitoring device as set forth in claim 1 wherein the audio output means are headphones disposed within the patrol vehicle.

4. A power supply monitoring device as set forth in claim 1 wherein a lamp circuit is connected to the output of the receiver in parallel with the audio output means for visually indicating the cathodic protection rectifier status.

5. A power supply monitoring device as set forth in claim 1 wherein the monitoring means comprises a resistance bridge circuit operably connected to the output of the cathodic protection rectifier across an output ammeter thereof, means for balancing said bridge at the lowest acceptable rectifier threshold output whereby when the rectifier output is below the acceptable level, bridge current will flow in one direction and when the rectifier output is above threshold level bridge current will flow in the opposite direction, operational amplifier means connected across the bridge circuit for amplifying bridge current, the output of said operational amplifier means being connected to the monitor switching means.

6. A power supply monitoring device as set forth in claim 5 wherein the signal modulating means comprises a notch filter feedback oscillator operably connected to the switching means whereby when said switching means is in one position, oscillator output is a monotone frequency and when the switching means is in the opposite position said output is a different monotone frequency, the output of said oscillator being connected to the transmitter through a transmitter modulator means.

7. A power supply monitoring device as set forth in claim 6 wherein the switching means comprises a dual state switch operably connected to the signal modulator means for changing the modulator output thereof from one frequency to the other, a tone modulator free running flip-flop operably connected to a first input of the dual state switch for alternately keying said switch from one position to the other for providing a dual tone output from the signal modulating means, a second input of said switch being operably connected to the output of the monitoring means for locking said monitoring means at one frequency only when the rectifier current is above a lowest acceptable threshold level.

8. A power supply monitoring device as set forth in claim 7 wherein the means for balancing said bridge comprises a voltage divider potentiometer having a resistive element thereof connected in the bridge circuit and a wiper arm thereof being operably connected to the output of the monitoring device D.C. power supply.

9. A power supply monitoring device as set forth in claim 8 wherein the monitoring device D.C. power supply includes a rectifier, a ripple voltage output of said monitoring device D.C. power rectifier is connected to the input of the operational amplifier means for causing rapid oscillatory output from the operational amplifier means when the rectifier current level is at or near the lowest acceptable threshold level thereby providing rapid sporadic switching of the switching means which in turn causes sporadic dual tone output from the signal modulating means.

* * * * *